United States Patent
Nagai

(10) Patent No.: US 10,845,726 B2
(45) Date of Patent: Nov. 24, 2020

(54) IMAGE FORMING APPARATUS WHICH CONTROLS EXPOSURE AMOUNT OF PHOTORECEPTOR PER UNIT AREA BY CORRECTING PULSE WIDTH OF DRIVE SIGNAL FOR DRIVING LIGHT SOURCE

(71) Applicant: CANON KABUSHIKI KAISHA, Tokyo (JP)

(72) Inventor: Jun Nagai, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/115,381

(22) Filed: Aug. 28, 2018

(65) Prior Publication Data
US 2019/0064694 A1    Feb. 28, 2019

(30) Foreign Application Priority Data
Aug. 31, 2017  (JP) .................................. 2017-167252

(51) Int. Cl.
*G03G 15/04*    (2006.01)
*G02B 26/12*    (2006.01)
*G03G 15/043*   (2006.01)

(52) U.S. Cl.
CPC ..... *G03G 15/04072* (2013.01); *G02B 26/121* (2013.01); *G03G 15/043* (2013.01); *G03G 15/0409* (2013.01); *G03G 15/04027* (2013.01)

(58) Field of Classification Search
CPC ....... G03G 15/04072; G03G 15/04027; G03G 15/0409; G03G 15/043; G02B 26/121
See application file for complete search history.

(56) References Cited

U.S. PATENT DOCUMENTS

| 2006/0187473 A1* | 8/2006 | Maeda | ............... G03G 15/0415 358/1.5 |
| 2007/0188592 A1* | 8/2007 | Toyama | ................... B41J 2/471 347/252 |
| 2013/0050388 A1* | 2/2013 | Ohnishi | ............... G03G 15/043 347/224 |

FOREIGN PATENT DOCUMENTS

JP    2003-320703 A    11/2003

* cited by examiner

*Primary Examiner* — Ryan D Walsh
(74) *Attorney, Agent, or Firm* — Canon U.S.A., Inc. IP Division

(57) ABSTRACT

Density unevenness occurs in an output image in the scanning direction of a laser beam because the amount of the laser beam reaching the surface of the photoreceptor is different for each position in the scanning direction of the laser beam.
The exposure amount (integrated light amount) per unit area on the photoreceptor is controlled to be substantially uniform by controlling the pulse widths of PWM signals according to the exposure positions of the laser beam, based on exposure amount correction data set according to the positions of the laser beam in the scanning direction.

2 Claims, 13 Drawing Sheets

POSITION IN MAIN SCANNING DIRECTION (mm)

POSITION IN MAIN SCANNING DIRECTION (mm)

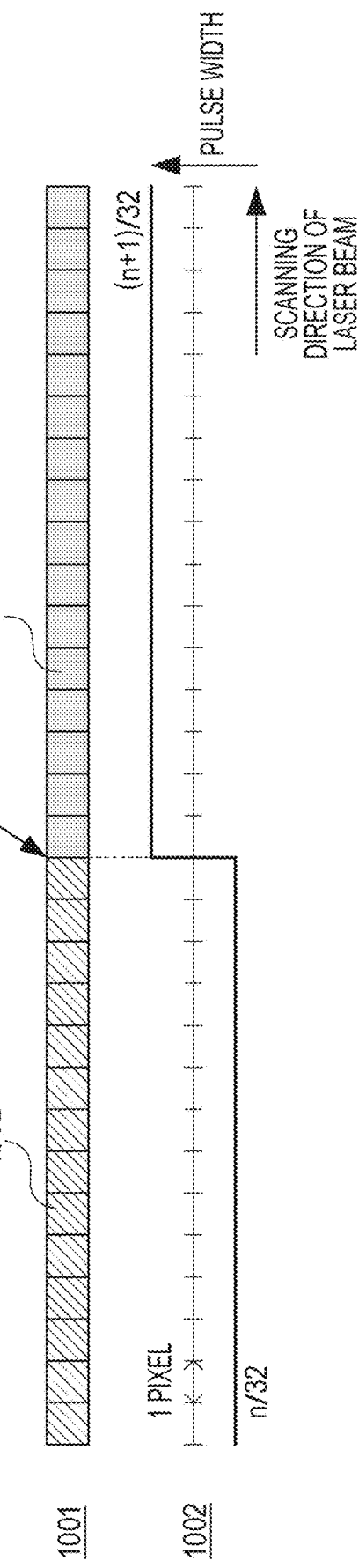
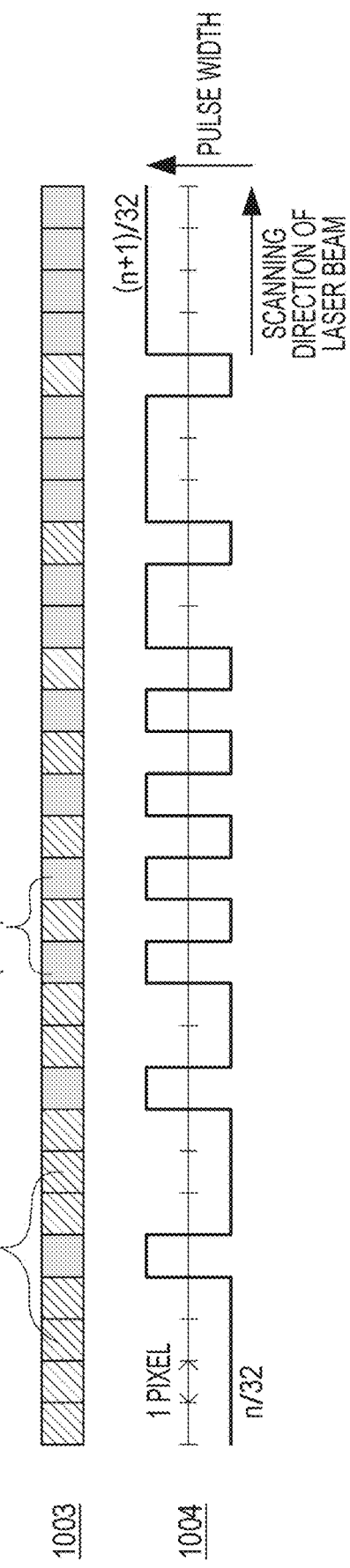
FIG. 10A
FIG. 10B

IMAGE FORMING APPARATUS WHICH CONTROLS EXPOSURE AMOUNT OF PHOTORECEPTOR PER UNIT AREA BY CORRECTING PULSE WIDTH OF DRIVE SIGNAL FOR DRIVING LIGHT SOURCE

BACKGROUND OF THE INVENTION

Field of the Invention

The aspect of the embodiments relates to an image forming apparatus that corrects an amount of exposure per unit area on a photoreceptor by controlling a pulse width of a drive signal for driving a light source that emits a laser beam.

Description of the Related Art

An electrophotographic image forming apparatus has an optical scanning device for exposing a photoreceptor to light to form an electrostatic latent image. The optical scanning device includes a light source that emits a laser beam, rotating polygon mirror, and scanning lens. The light source emits a laser beam based on the image data. The rotating polygon mirror deflects the laser beam so that the photoreceptor is scanned with the laser beam emitted from the light source. The scanning lens guides the laser beam deflected by the rotating polygon mirror onto the photoreceptor. An electrostatic latent image is formed on the photoreceptor by being exposed to the laser beam. A toner image is formed on the photoreceptor by developing the electrostatic latent image with toner, and a toner image is formed on the recording medium by being transferred onto the recording medium. The toner image on the recording medium is fixed thereon by a fixing device. In order to output an image in which the density unevenness is suppressed in the scanning direction of the laser beam, the amount of exposure to the laser beam is to be controlled according to the exposure position.

Here, the exposure amount per unit area on the photoreceptor is not necessarily constant in the scanning direction of the laser beam. This is because the intensity of the laser beam for irradiating the photoreceptor is not constant in the scanning direction, and the main reason for this is that the transmission loss of the scanning lens having the fθ characteristic varies depending on the incident angle. Here, the fθ characteristic is an optical characteristic for focusing the laser beam on the surface of the photoreceptor so that the spot of the laser beam moves on the surface of the photoreceptor at a constant speed while the rotating polygon mirror is rotating at a constant angular velocity.

In general, the laser beam with respect to the scanning lens has an optical path perpendicular to the longitudinal direction of the scanning lens at the center of the scanning lens, and has an optical path oblique to the longitudinal direction of the scanning lens as the beam moves toward the end of the scanning lens. As a result, the transmission loss of the scanning lens is smallest at the center in the longitudinal direction of the scanning lens and increases toward the end. For this reason, the intensity of the laser beam on the surface of the photoreceptor is strongest at the center in the scanning direction of the laser beam and weakens toward the end in the scanning direction. That is, the exposure amount per unit area on the photoreceptor in the scanning direction of the laser beam becomes non-uniform.

Furthermore, in recent years, in order to reduce the size and cost of the image forming apparatus, it is considered not to use a scanning lens or considered to use a small scanning lens not having the fθ characteristic (or having a low fθ characteristic). An image forming apparatus having such an optical scanning device in which the spot of a laser beam does not move at a constant speed on the surface of the photoreceptor changes the pulse width of the drive signal (pulse width modulation (PWM) signal) for ON/OFF driving of the laser beam source according to the exposure position in the scanning direction of the laser beam so as to make the width of one dot formed on the surface of the photoreceptor constant. In such an image forming apparatus, the width of a dot formed on the surface of the photoreceptor is constant, but since the moving speed of the spot of the laser beam on the surface of the photoreceptor is not constant, the exposure amount per unit area of the dot at the center of the receptor will be different from that at the ends.

Japanese Patent Laid-Open No. 2003-320703 discloses an exposure method in which the intensity of laser beam emitted from a light source is changed in accordance with the scanning position of the laser, in view of the situation that the exposure amount per unit area varies depending on the exposure position in the scanning direction of the laser beam.

However, in order to change the intensity of the laser beam emitted from the light source in accordance with the exposure position of the laser beam, a modulator for modulating the intensity is to be mounted. That is, the value of the current for causing the laser beam source to emit the beam for each exposure position in the scanning direction of the laser beam is to be controlled, and for this purpose, a circuit such as a regulator for modulating the intensity of the laser beam is to be mounted. However, mounting such a modulator invites cost increase.

An image forming apparatus capable of correcting and making the exposure amount per unit area uniform on the photoreceptor by correcting image data on the basis of correction data corresponding to a position in a scanning direction of a laser beam is sought.

SUMMARY OF THE INVENTION

The aspect of the embodiments has been characterized by having a photoreceptor, a laser beam source for emitting a laser beam to which the photoreceptor is exposed, a driving unit for performing ON/OFF driving of the laser beam source in accordance with a drive signal including a pulse for causing the laser beam source to emit the laser beam, a mirror for deflecting the laser beam so that the photoreceptor is scanned with the laser beam, a processing unit for performing halftone processing for generating density data for each pixel on the basis of input image data, a storage unit for storing correction data for correcting and changing the width of the pulse included in the drive signal into a width corresponding to the exposure position of the laser beam in the scanning direction of the laser beam in association with a position in the scanning direction on the photoreceptor, and a generating unit for generating a drive signal including a pulse for turning on the laser beam source by generating a bit pattern including a plurality of pieces of bit data based on generated density data and the correction data corresponding to the pixel position of the density data in the scanning direction of the laser beam and by outputting the bit pattern in synchronization with a clock signal.

Further features of the disclosure will become apparent from the following description of exemplary embodiments (with reference to the attached drawings).

BRIEF DESCRIPTION OF THE DRAWINGS

FIGS. 10A and 10B are diagrams illustrating details of the cause and a suppression method of a density step.

DESCRIPTION OF THE EMBODIMENTS

Figure 1:
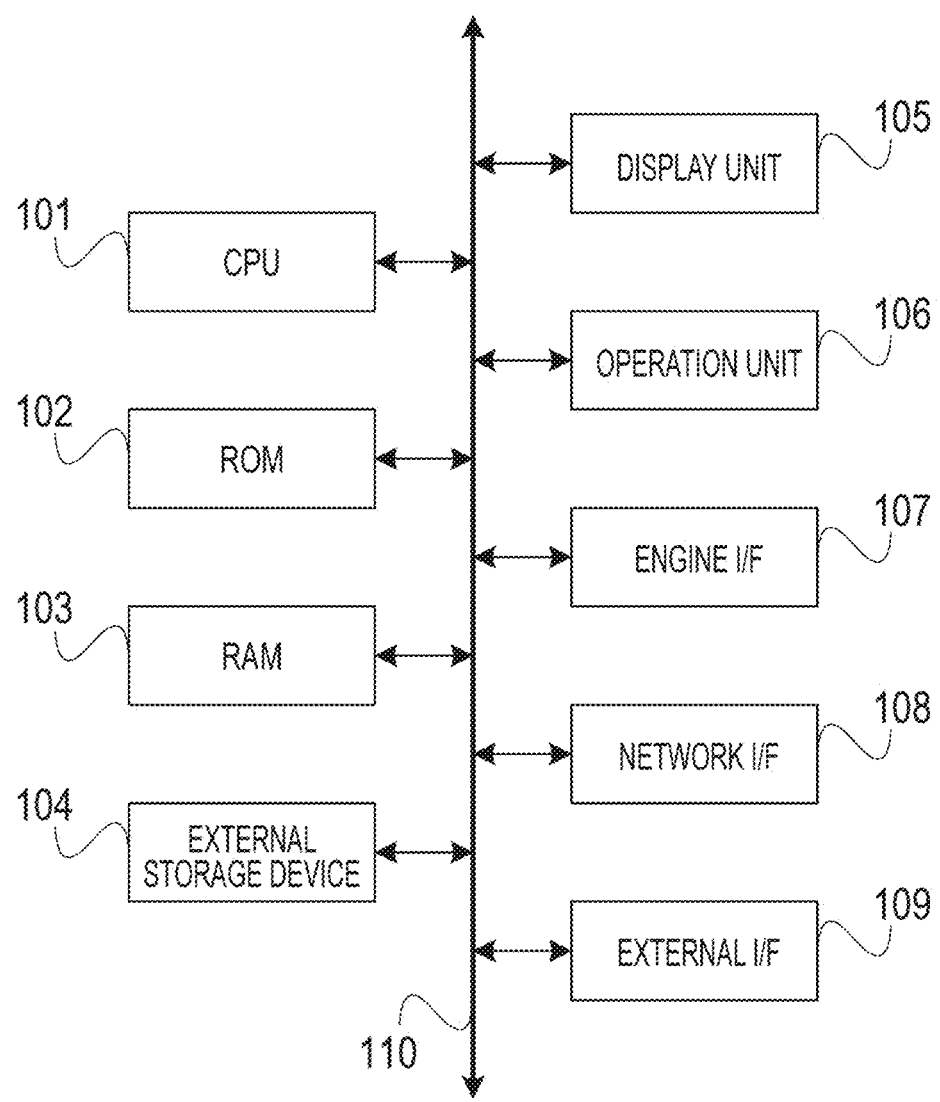
FIG. 1 is a block diagram showing a configuration of an image processing device in each embodiment.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

First Embodiment

Hereinafter, the embodiment will be described with reference to the drawings. As the embodiment, a multifunction printer (MFP) which is an electrophotographic color image forming apparatus will be exemplified below, but the embodiment is not limited thereto. That is, the embodiment may be an electrophotographic image forming apparatus such as a laser printer or a facsimile machine, or an image forming apparatus capable of forming only a monochrome image.

FIG. 1 is a block diagram showing a basic configuration of an image processing device according to the present embodiment. The image processing device takes charge of various kinds of control of the image forming apparatus. The image processing device includes a CPU 101, a ROM 102, a RAM 103, an external storage device 104, a display unit 105, an operation unit 106, an engine interface 107, a network interface 108, an external interface 109, and a system bus 110.

As for description of the above configuration in detail, the CPU 101 is a central processing unit that performs overall control of the apparatus and calculation processing, and is an integrated circuit that executes each processing described below based on programs stored in the ROM 102. The ROM 102 is a read-only memory. The ROM 102 has a storage area for storing system startup programs, programs for controlling a printer engine, and data such as character data and character code information. The RAM 103 is a random access memory. Font data additionally registered by downloading is stored in the RAM 103, and programs and data are loaded for each of various types of processing. Further, various programs are developed in the RAM 103 and executed by the CPU 101. In addition, the RAM 103 can also be used as a data storage area of the received image data. The external storage device 104 is composed of a hard disk or the like, for example. The external storage device 104 spools data, stores a program and each information file/image data, and is used as a working area of the CPU 101.

The display unit 105 has, for example, a liquid crystal display and performs various displays under the control of the CPU 101. The display unit 105 is used for displaying, for example, the setting state of the image forming apparatus, the current processing inside the apparatus, the error state, and the like. The operation unit 106 is used by the user to instruct the image forming apparatus to change or reset the setting. The operation unit 106 provides a user interface together with the display unit 105.

The engine interface 107 is an interface for inputting and outputting commands and the like for controlling the printer engine. The network interface 108 is an interface for connecting the image processing device to the network. For example, the image processing device receives image data and drawing commands from the host computer via the network and the network interface 108. The external interface 109 is connected to a scanner or a digital camera which is an image input device via, for example, a parallel or serial interface. The system bus 110 functions as a data path between the above-described components.

A processing procedure shown in a flowchart to be described later is stored in any one of the ROM 102, RAM 103, and storage device 104, and is executed by the CPU 101.

Figure 2:
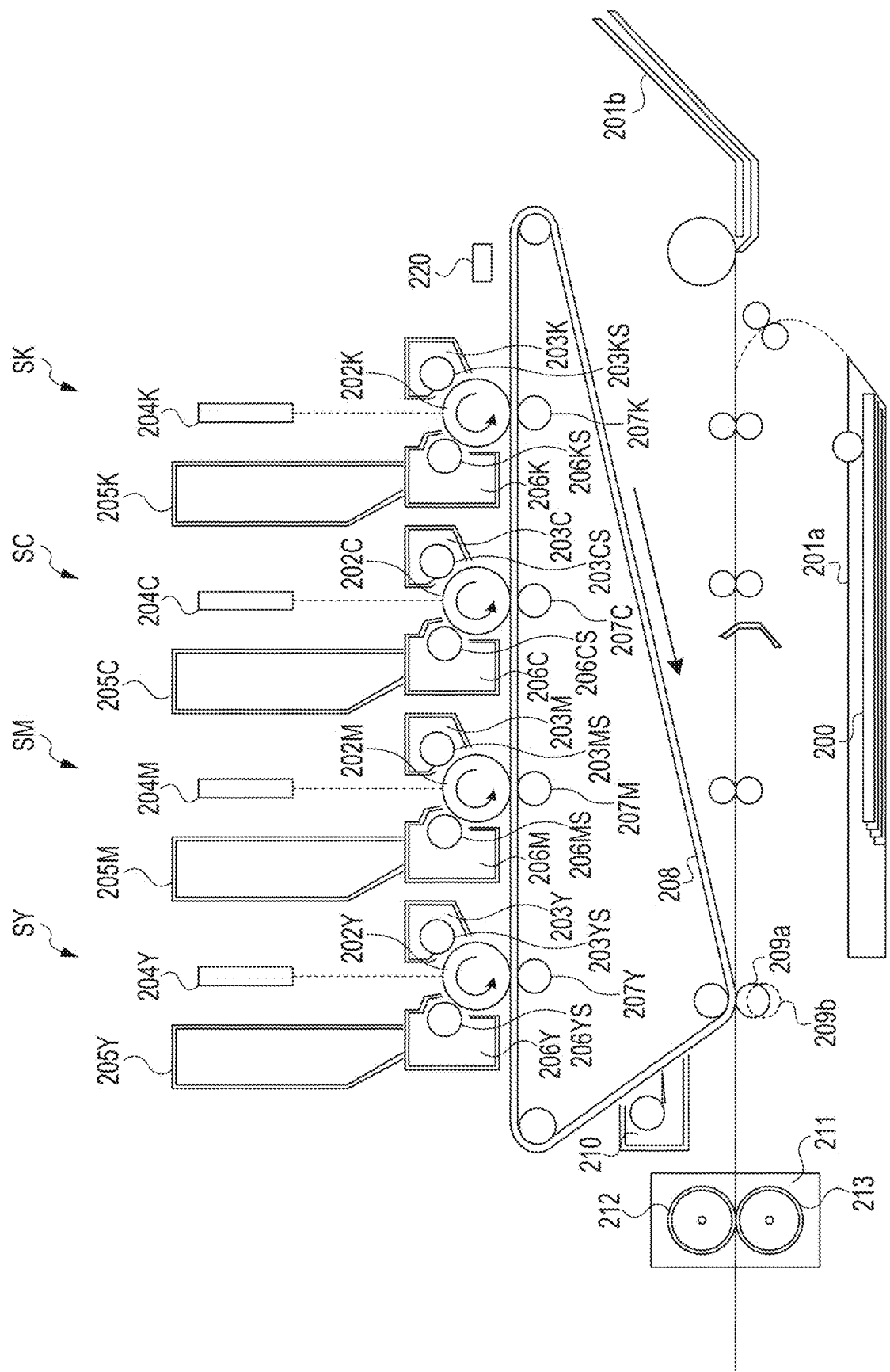
FIG. 2 is a diagram for illustrating the operation of a printer engine which is an image output device in each embodiment.

The operation of the printer engine included in the image forming apparatus according to the present embodiment will be described with reference to FIG. 2. The printer engine drives the exposure light source according to the exposure time determined by the image data output from the output image processing section to be described later to form an electrostatic latent image on a photosensitive drum that is the photoreceptor, and develops the electrostatic latent image to form a single color toner image. Then, single color toner images thus formed are superimposed on each other to form a multicolor toner image, and after the multicolor toner image is transferred to a recording medium 200, the multicolor toner image on the recording medium is fixed.

The printer engine includes an image forming unit SY, SM, SC and SK for forming a toner image (developer image) using toners (developers) of yellow (Y), magenta (M), cyan (C), and black (K), respectively. Hereinafter, the image forming units SY, SM, SC, and SK are also referred to as a first station, second station, third station, and fourth station, respectively. The image forming units SY, SM, SC, and SK are arranged along the peripheral surface of an intermediate transfer belt 208 in order from the upstream side to the downstream side in the movement direction of the peripheral surface.

The printer engine includes charging devices 203Y, 203M, 203C, and 203K for charging photosensitive drums 202Y, 202M, 202C, and 202K, which are photoreceptors. Sleeves 203YS, 203MS, 203CS and 203KS are provided in the charging devices respectively.

The photosensitive drums 202Y, 202M, 202C, and 202K are formed by applying an organic photoconductive layer on the outer periphery of an aluminum cylinder, and are rotatable by the driving force transmission of a drive motor (not shown). The drive motor can rotate the photosensitive drums 202Y, 202M, 202C, and 202K counterclockwise according to the image forming operation.

The printer engine includes optical scanning devices 204Y, 204M, 204C, and 204K that irradiate the photosensitive drums 202Y, 202M, 202C, and 202K with light, respectively. The optical scanning devices 204Y, 204M, 204C, and 204K emit laser beams and form electrostatic latent images on the corresponding photosensitive drums 202Y, 202M, 202C, and 202K by the laser beams.

In order to visualize the electrostatic latent image, the printer engine includes four developing devices 206Y, 206M, 206C, and 206K that perform development for respective stations. Sleeves 206YS, 206MS, 206CS and 206KS are provided in the developing devices, respectively. Incidentally, each of the developing devices 206Y, 206M, 206C, and 206K can be attached and detached.

The printer engine includes a transfer unit. The transfer unit rotates an intermediate transfer belt 208, which is the intermediate transfer member, in the clockwise direction in order to transfer the single color toner image from the photosensitive drum 202 to the intermediate transfer belt 208. Then, the single color toner images are transferred to the intermediate transfer belt 208 with the rotation of the respective photosensitive drums 202Y, 202M, 202C and 202K and primary transfer rollers 207Y, 207M, 207C and 207K positioned opposite thereto, respectively. An appropriate bias voltage is applied to the primary transfer roller 207, and the rotational speed of the photosensitive drum 202 and the rotational speed of the intermediate transfer belt 208 are differentiated from each other to efficiently transfer the single color toner image onto the intermediate transfer belt 208.

The Y color toner image formed on the photosensitive drum 202Y in the image forming unit SY (first station) is transferred onto the intermediate transfer belt 208 as described above as the photosensitive drum 202Y rotates. The Y color toner image transferred onto the intermediate transfer belt 208 is conveyed as the peripheral surface of the intermediate transfer belt 208 moves. The toner images of colors M, C, and K formed at the second to fourth stations are transferred from the photosensitive drums 202M, 202C, and 202K and superimposed onto the Y color toner image respectively in synchronization with the movement of the Y color toner image on the intermediate transfer belt 208. Due to this, a multicolor toner image of four colors is formed on the surface of the intermediate transfer belt 208. The superimposed multicolor toner image is conveyed to a secondary transfer roller 209 by the intermediate transfer belt 208.

The recording medium 200 is nipped and conveyed from a paper feed tray 201a or 201b to the secondary transfer roller 209, and the multicolor toner image on the intermediate transfer belt 208 is transferred onto the recording medium 200. Appropriate bias voltage is applied to the secondary transfer roller 209 to electrostatically transfer the toner image (this is referred to as a secondary transfer). While transferring the multicolor toner image onto the recording medium 200, the secondary transfer roller 209 is in contact with the recording medium 200 at a position 209a and separates to a position 209b after the processing.

The printer engine includes a fixing unit. In order to fuse and fix the multicolor toner image transferred onto the recording medium 200 thereon, the fixing unit includes a fixing roller 212 for heating the recording medium 200 and a pressing roller 213 for bringing the recording medium 200 into pressure contact with the fixing roller 212. The fixing roller 212 and the pressing roller 213 are formed in hollow shapes to have built-in heaters respectively. While conveying the recording medium 200 holding the multicolor toner image by using the fixing roller 212 and the pressing roller 213, a fixing device 211 applies heat and pressure to fix the toner on the recording medium 200.

After the fixing of the toner, the recording medium 200 is discharged to a discharge tray (not shown) by a discharge roller (not shown), and the image forming operation is completed.

The printer engine includes a cleaning unit 210. The cleaning unit 210 removes the toner remaining on the intermediate transfer belt 208, and the toner remaining on the intermediate transfer belt 208 is stored in a cleaner container (not shown) after the four-color multicolor toner image formed on the intermediate transfer belt 208 is transferred to the recording medium 200.

Figure 3:
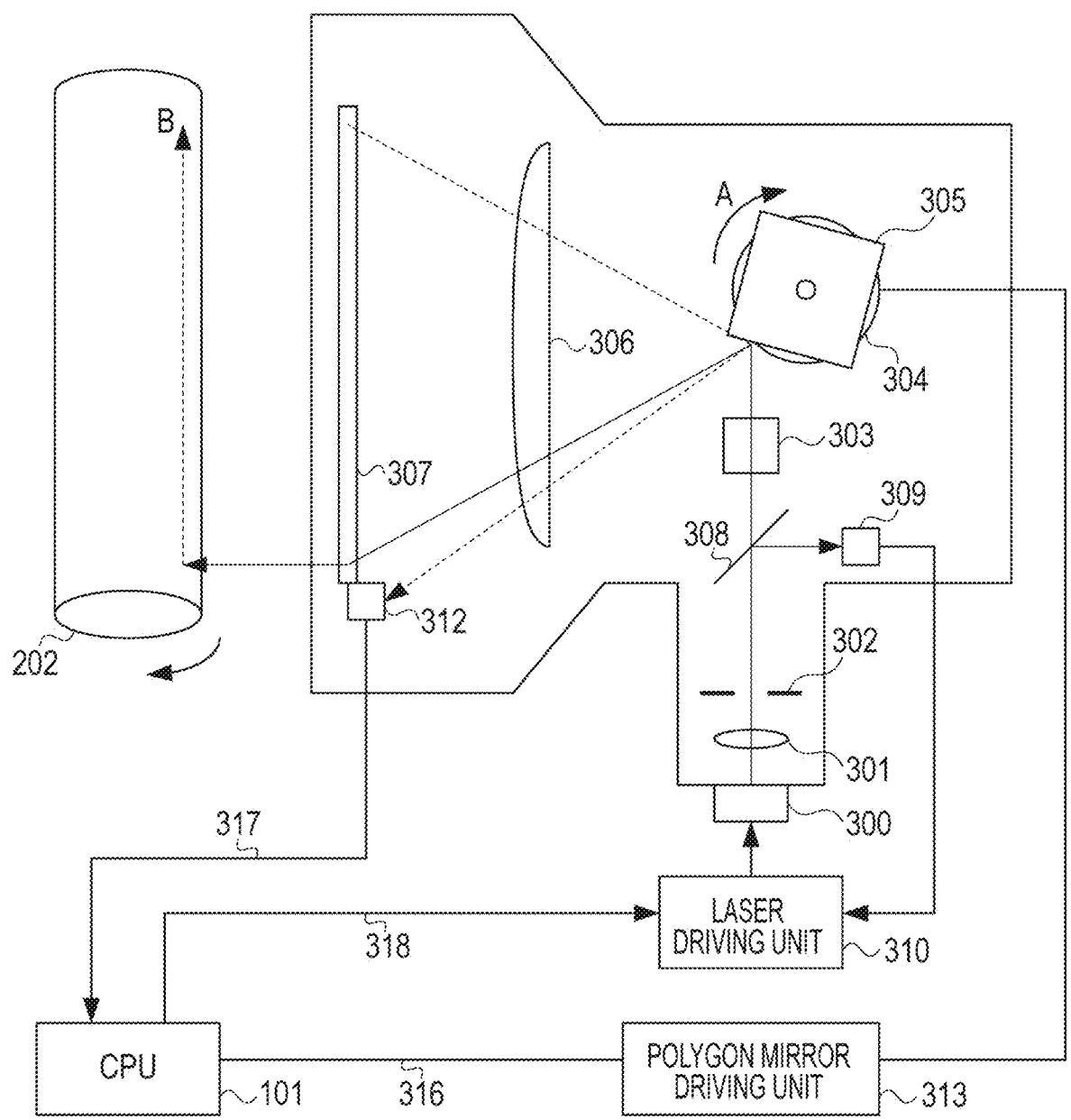
FIG. 3 is a configuration diagram of an optical scanning device in each embodiment.

Next, the optical scanning device will be described. FIG. 3 is a configuration diagram of the optical scanning devices 204Y, 204M, 204C, and 204K in the present embodiment. Since each optical scanning device has the same configuration, the optical scanning device 204K is exemplified in FIG. 3.

In FIG. 3, laser beam, which is divergent light emitted from a laser beam source 300 (laser diode) is made substantially collimated by a collimator lens 301. The laser beam is shaped by a diaphragm 302 after having passed through the collimator lens 301. The laser beam having passed through the diaphragm 302 is incident on a beam splitter 308. The beam splitter 308 splits the laser beam having passed through the diaphragm 302 into a laser beam to be incident on a photodiode 309 (hereinafter referred to as a PD 309), which is a light receiving unit, and a laser beam directed to a rotating polygon mirror 305 (hereinafter, referred to as a polygon mirror 305). The PD 309 outputs a detection signal having a value corresponding to the amount of the laser beam in response to the reception of the laser beam. Based on the detection signal from the PD 309, a laser driving unit 310 controls the value of the driving current to be supplied to the laser beam source so that the amount of light incident on the photodiode 309 becomes the target light amount. Note that the laser driving unit 310 is controlled to emit light by a light emission control signal 318 from the CPU 101. The PD 309 may be incorporated in the laser beam source 300.

The laser beam that has passed through the beam splitter 308 passes through a cylindrical lens 303 and is incident on the rotating polygon mirror 305, which is a deflecting device. The polygon mirror 305 has a plurality of reflecting surfaces. The polygon mirror 305 rotates in the direction of the arrow A by being driven by a motor 304. The polygon mirror 305 deflects the laser beam incident on the reflecting surface so that the photosensitive drum 14 is scanned with the laser beam in the direction of the arrow B. The laser beam deflected by the polygon mirror 305 passes through a scanning lens 306 having the fθ characteristic and is guided onto the photosensitive drum 202K via a mirror 307.

The optical scanning device 204K includes a beam detector 312 (hereinafter referred to as a BD 312), which is a synchronization signal generating unit. The BD 312 is disposed at a position on the scanning path of the laser beam and out of the image forming area on the photosensitive drum 202K. The BD 312 receives the laser beam deflected by the polygon mirror 305 and generates a horizontal sync signal 317. The horizontal sync signal 317 is input to the CPU 101. The CPU 101 transmits a control signal 316 of an acceleration signal or a deceleration signal to a motor driving unit 313 (a polygon mirror driving unit) so that the horizontal sync signal 317 has a reference cycle corresponding to the target speed of the polygon mirror 305 and the phase relationship with a polygon mirror provided in another optical scanning device has a predetermined phase relationship. The motor driving unit 313 accelerates the rotation speed of the motor 304 based on the acceleration signal and decelerates the rotation speed of the motor 304 based on the deceleration signal.

Further, the CPU 101 controls the emission timing of the laser beam according to the image data from the laser beam source 300 on the basis of the horizontal sync signal 317. The CPU 101 includes a counter (not shown) that resets the count in response to the input of the horizontal sync signal 317 and starts counting of a clock signal to be described later, from the reset state. The CPU 101 controls the image processing section and the laser driving unit 310 to be described later, based on the count value of the counter.

Figure 4:
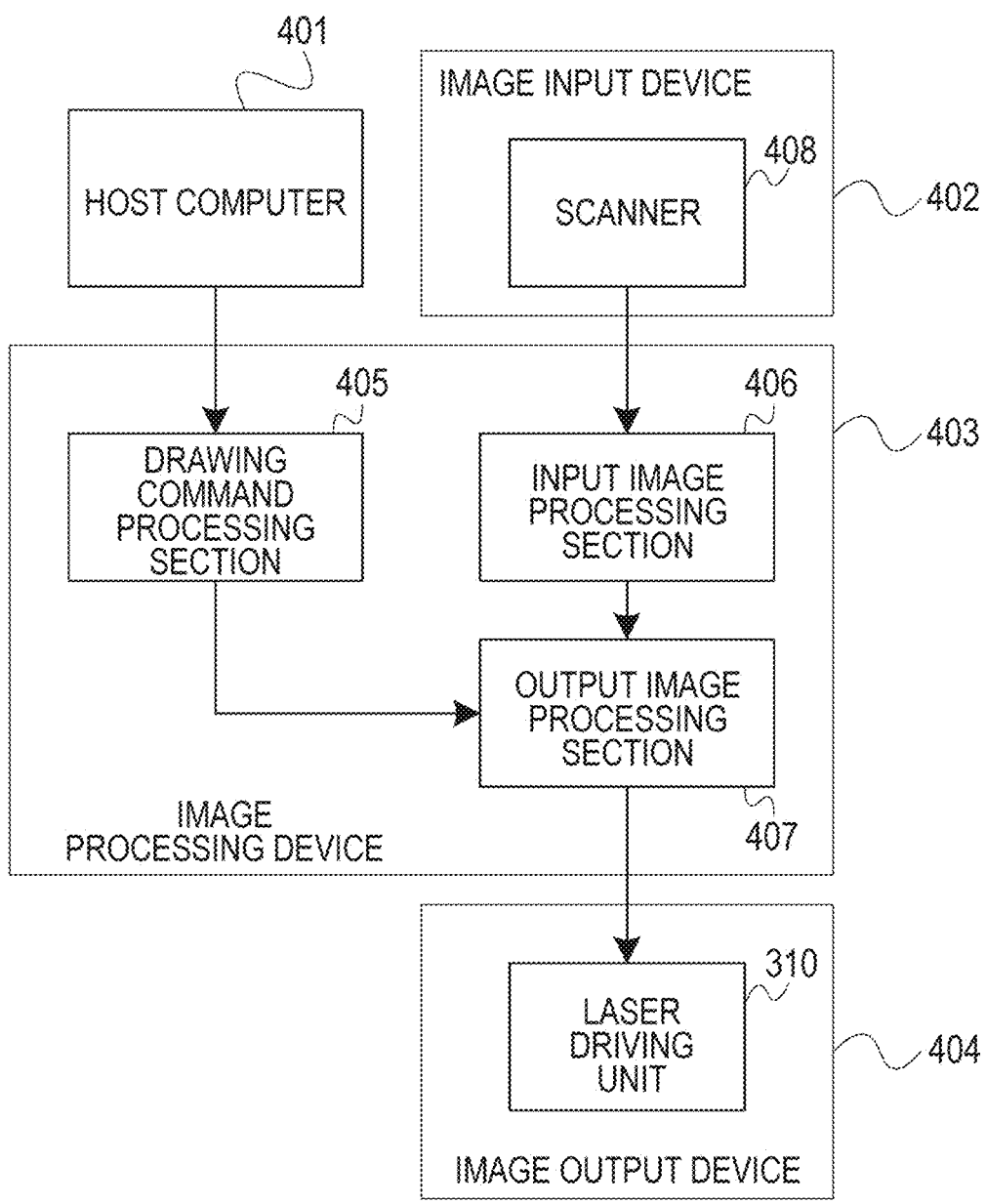
FIG. 4 is a block diagram showing the configuration of an image forming apparatus in each embodiment.

FIG. 4 is a block diagram showing the configuration of the image forming apparatus in the present embodiment. The image forming apparatus is an MFP having an image input device 402, image processing device 403, and image output device 404. Here, the image processing device 403 includes a drawing command processing section 405, an input image processing section 406, and an output image processing section 407. Incidentally, it is assumed that the image processing device 403 in the present embodiment is built in the CPU 101. The drawing command processing section 405, input image processing section 406, and output image processing section 407, which are the respective functional sections of the image processing device 403, are mounted in the CPU 101, as internal modules for example, and operated as the CPU 101 executes the predetermined program stored in the ROM 102. Part or all of the drawing command processing section 405, input image processing section 406, and output image processing section 407 may be mounted on a dedicated IC (processor) different from the CPU 101.

The drawing command processing section 405 analyzes drawing commands received from a host computer 401 via the network I/F 108, and generates drawing objects, further performing rasterizing processing to generate bitmap images.

A scanner 408 is connected to the image processing device 403 via the external I/F 109. The scanner 408 optically scans an image printed on paper or a film, and measures the intensity of the reflected light or the transmitted light, thereby reading the bitmap image by analog-digital conversion. The input image processing section 406 performs well-known image processing such as shading correction, inter-line correction, and color correction on the bitmap image received from the scanner 408.

The output image processing section 407 performs image processing such as color conversion processing, halftone processing, and the like corresponding to the print setting on the generated bitmap image, and generates image data to be transmitted to the image output device. Also, an exposure control processing for correcting the image data based on the exposure amount correction data corresponding to each position in the scanning direction of the laser beam is also performed. Details of the processing of the output image processing section 407 will be described later. The image data thus generated is transmitted to the image output device 404 via the engine interface 107.

The laser driving unit 310 controls to cause the laser beam source 300 to be in a lighting state or a non-lighting state based on the PWM signal.

Figure 5:
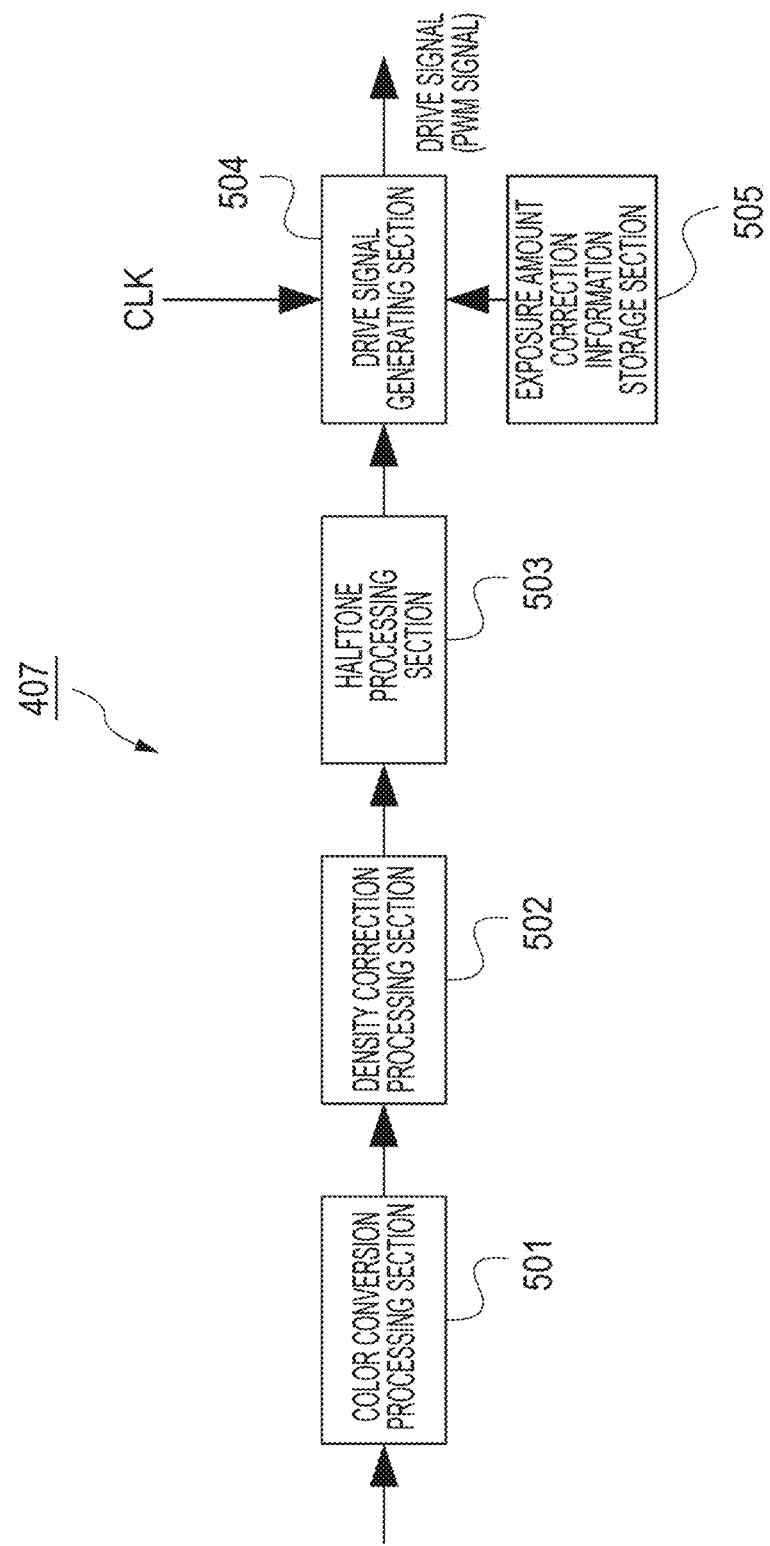
FIG. 5 is a block diagram showing the configuration of an output image processing section.

FIG. 5 is a block diagram showing the configuration of the output image processing section 407. The output image processing section 407 includes a color conversion processing section 501, a density correction processing section 502, a halftone processing section 503, a drive signal generating section 504, and an exposure amount correction information storage section 505 as internal modules.

The color conversion processing section 501 performs conversion processing for converting the RGB color space image data (input image data) input from the drawing command processing section 405 or the input image processing section 406 into CMYK color space image data corresponding to four color toners of CMYK for image formation by the printer engine.

The density correction processing section 502 performs density correction processing on CMYK image data subjected to color conversion processing and performs gamma correction for correcting the density characteristic peculiar to the printer engine. As a specific processing method, there are a method of using a density correction table that associates an input density level with an output density level for each color of CMYK, and a method of procurement by calculation using a function.

The halftone processing section 503 performs halftone processing on CMYK image data in which the density has been corrected by the density correction processing section 502. Usually, the printer engines are often capable of outputting only low level gradations such as 2, 4, and 16 gradations. Therefore, halftone processing such as error diffusion processing and dither processing is performed in the halftone processing section 503 so that stable halftone expression can be performed even in a printer engine that can output only a small number of gradations.

The drive signal generating section 504 corrects the image data based on the exposure amount correction data held in the exposure amount correction information storage section 505 so that the exposure amount becomes substantially constant in the scanning direction of the laser beam. Here, the exposure amount means the integrated light amount per unit area with which the surface of the photosensitive drum is irradiated.

Figure 6A:
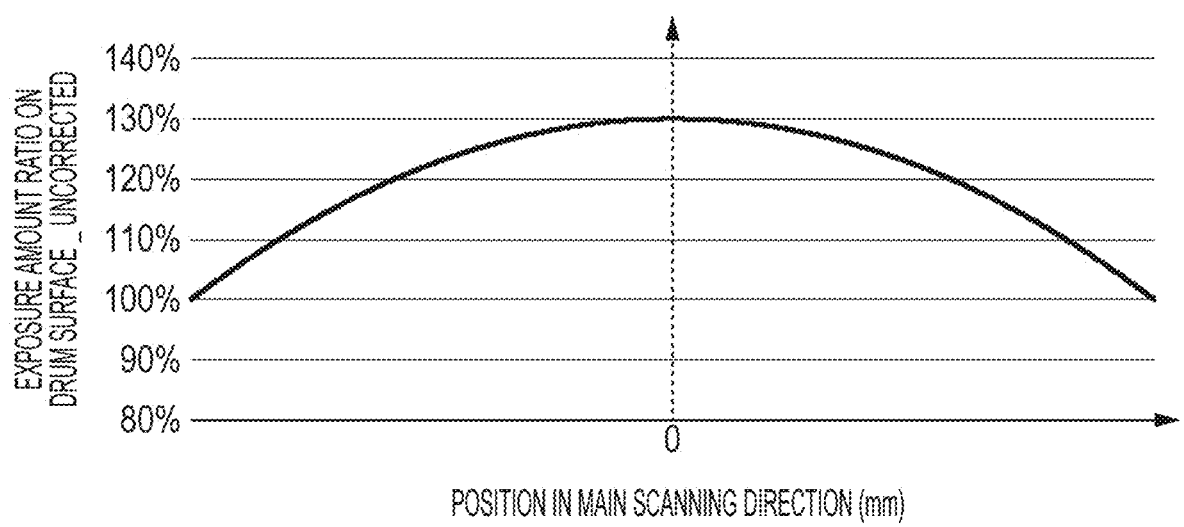
FIGS. 6A and 6B are diagrams showing examples of a laser intensity characteristic and exposure amount correction data on the surface of a photosensitive drum.
Figure 6B:
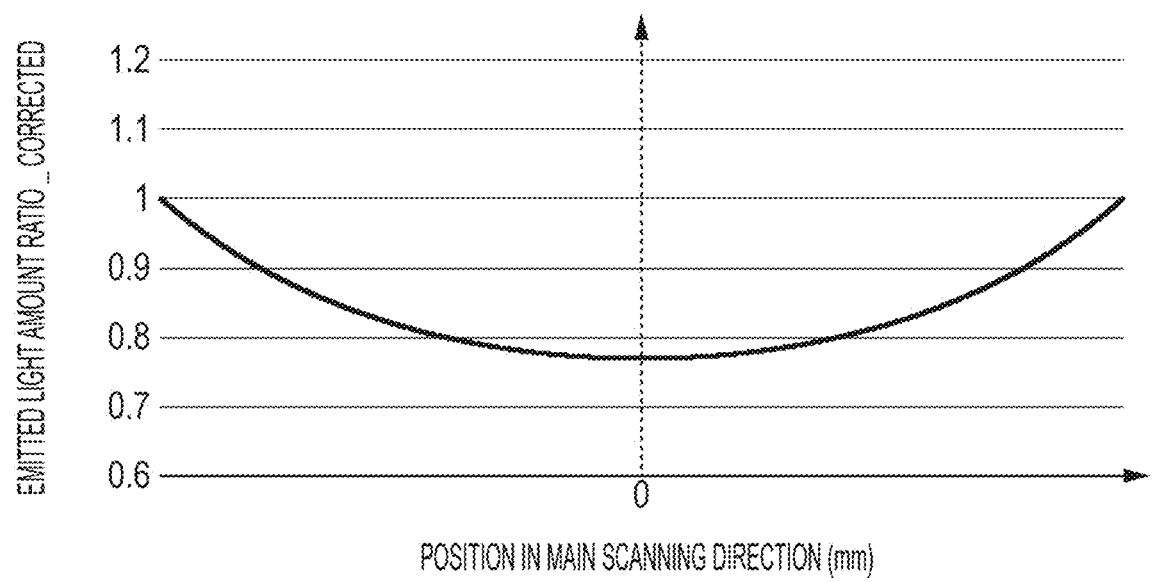

In FIG. 3, the transmittance of the scanning lens 306 is not uniform in the scanning direction of the laser beam, and usually the transmittance at both ends is lower than the transmittance at the center in the scanning direction of the laser beam. Therefore, the intensity of the laser beam on the surface of the photosensitive drum 202 is relatively lower at both ends than at the center. This state is shown in FIGS. 6A and 6B. FIG. 6A shows the intensity characteristics of the laser beam on the surface of the photosensitive drum, and the characteristic is highest at the center of the photosensitive drum and becomes lower as approaching both ends of the photosensitive drum. In the example shown in the figure, when the intensity at both ends is taken as 100%, the intensity at the center is 130%. By controlling the intensity of the laser beam according to the scanning position, the intensity of the laser beam on the surface of the photosensitive drum can be made substantially uniform. The intensity of the laser beam can be controlled by adjusting the amount of current to be supplied to the laser beam source 300. In order to adjust the amount of current to be supplied to the laser beam source 300, an adjustment circuit for adjusting the amount of current in the laser driving unit 310 (laser driver IC) is provided, or an adjustment circuit for adjusting the current amount outside the laser driver IC is provided. However, providing these adjustment circuits brings an increase in the number of circuits, which leads to an increase in cost of the image forming apparatus. In particular, if an adjustment circuit for adjusting the amount of current is provided outside the laser driver IC, the area of the circuit board on which the laser driver IC and the adjustment circuit are mounted increases.

The image forming apparatus of the present embodiment controls to keep the exposure amount uniform on the surface of the photosensitive drum 202 regardless of the scanning position by correcting the image data. This corrects the pulse width of the drive signal (PWM signal) for turning on/off the laser beam source according to the intensity level of the laser beam on the surface of the photosensitive drum.

FIG. 6B shows an example of exposure amount correction data. FIG. 6B shows exposure amount correction data applied to the optical scanning device having the intensity characteristic shown in FIG. 6A. In the exposure amount correction data of FIG. 6B, the correction value for the pixels located at both ends in the scanning direction of the laser beam is set to "1". Therefore, in the image forming apparatus of the present embodiment, the exposure amount is not corrected for pixels located at both ends in the scanning direction of the laser beam. On the other hand, in the exposure amount correction data of FIG. 6B, the correction value for the pixel located at the center in the scanning direction of the laser beam is set to about "0.77". This means that the exposure amount of the central pixel is controlled to be 0.77 times the exposure amount of the pixels at the both ends. The scaling of the correction of the exposure amount is practically performed not indiscreetly but discretely, and is determined by the number of divisions per pixel during the PWM conversion processing.

The halftone processing and the PWM conversion processing will be described with reference to FIG. 7. The halftone processing section 503 performs halftone processing (error diffusion processing or dither processing) on multiple value density data 701 in which the density has been corrected in the density correction processing section 502 to generate halftone data 702 (density data) of four gradations (2 bits) for each pixel. The four gradations generated in the halftone processing include density values of 0%, 33%, 67%, and 100%, respectively. The halftone data 702 in FIG. 7 indicates that four pixels having a density value of 0%, one pixel having a density value of 33%, and four pixels having a density value of 100% are included in an area of 3×3 pixels. The drive signal generating section 504 generates a bit pattern of 32 bits based on the halftone data of four gradations of the nine pixels and the exposure amount correction data set corresponding to the position of each pixel in the scanning direction of the laser beam (PWM conversion). Each piece of bit data included in the bit pattern of 32 bits indicates either data for turning on the laser beam source to emit laser beam or OFF data for not emitting laser beam from the laser beam source.

Figure 7:
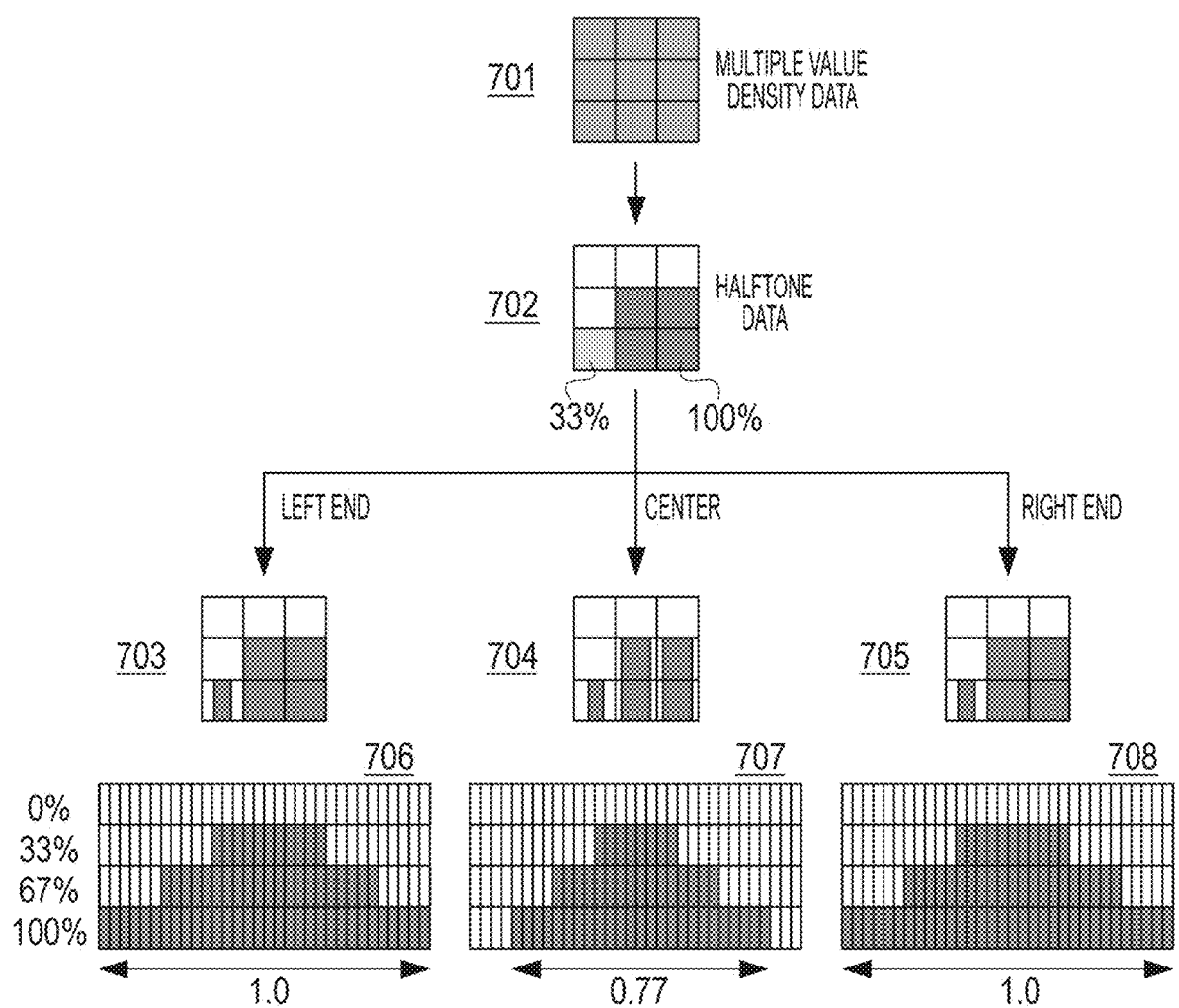
FIG. 7 is a schematic diagram showing bit pattern generation processing in a first embodiment.

Here, since the exposure amount correction ratio is set to "1" for the pixels 703 and 705 arranged at both ends in the scanning direction of the laser beam, which are shown in FIG. 7, the drive signal generating section 504 does not substantially perform correction based on the exposure amount correction data. That is, the drive signal generating section 504 generates a bit pattern in which all 32 pieces of bit data are OFF data from 0% halftone data. In addition, the drive signal generating section 504 generates a bit pattern including 11 pieces of ON data and 21 pieces of OFF data out of 32 pieces of bit data from 33% halftone data. Further, the drive signal generating section 504 generates a bit pattern including 21 pieces of ON data and 11 pieces of OFF data out of 32 pieces of bit data from 67% halftone data. Still further, the drive signal generating section 504 generates a bit pattern in which all of 32 pieces of bit data are ON data from 100% halftone data.

On the other hand, since the exposure amount correction ratio is set to "0.77" for the pixel 704 disposed in the center in the scanning direction of the laser beam, which is shown in FIG. 7, when the pixel is formed on the basis of the same halftone data, a bit pattern is formed such that the pulse width of the drive signal for the pixel 704 is about 0.77 times the pulse width of the drive signal for the pixel 703 and the pixel 705. That is, the drive signal generating section 504 generates a bit pattern in which all 32 pieces of bit data are OFF data from 0% halftone data. In addition, the drive signal generating section 504 generates a bit pattern including 8 pieces of ON data and 24 pieces of OFF data out of 32 pieces of bit data from 33% halftone data. Further, the drive signal generating section 504 generates a bit pattern including 16 pieces of ON data and 16 pieces of OFF data out of 32 pieces of bit data from 67% halftone data. Still further, the drive signal generating section 504 generates a bit pattern including 25 pieces of ON data and 7 pieces of OFF data out of 32 pieces of bit data from 100% halftone data. It should be noted that the pieces of the ON data included in the bit pattern are arranged continuously in FIG. 7, but may be discretely arranged within the range in which the emission responsiveness of the laser beam source is secured.

Figure 8A:
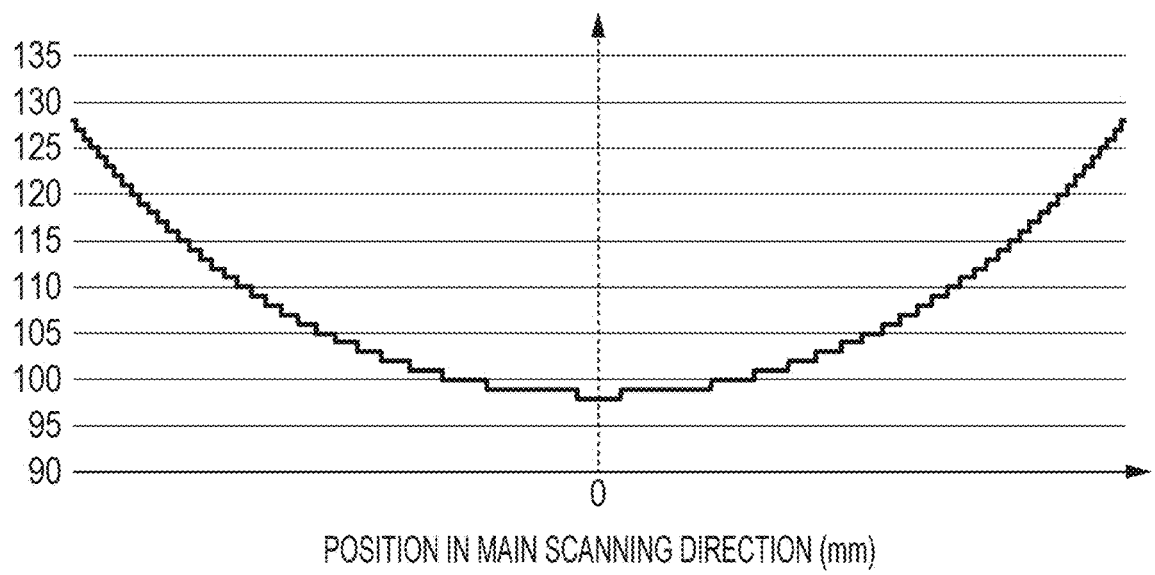
FIGS. 8A and 8B are diagrams showing a result of exposure amount correction in the first embodiment.
Figure 8B:
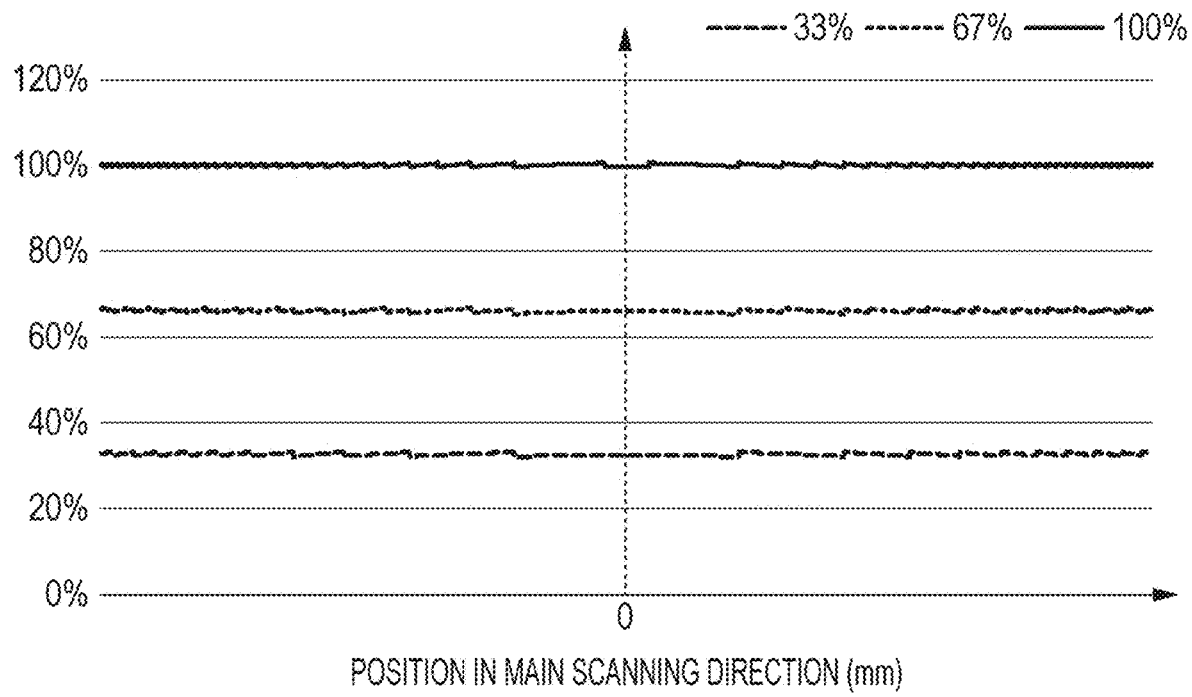

In FIG. 7, an example of the PWM conversion for converting halftone data for one pixel into a bit pattern including 32 pieces of bit data has been illustrated, but as the number of pieces of bit data included in the bit pattern becomes larger, more continuous scaling becomes possible. For example, as shown in FIGS. 8A and 8B, halftone data of one pixel may be converted into a bit pattern including 128 pieces of bit data. Further, the unit of processing of the PWM conversion is not limited to one pixel, and a bit pattern may be assigned to a unit smaller than one pixel or larger than one pixel. One pixel of an image forming apparatus provided with an optical scanning device is defined mainly by the scanning interval in the rotational direction of the photosensitive drum. For example, by controlling the phase relationship between the rotation cycle of the photosensitive drum and the rotation cycle of the polygon mirror, the scanning line interval can be made equivalent to 600 dpi (42.6 µm) or equivalent to 1200 dpi (21.3 µm). On the other hand, the exposure range in the scanning direction of the laser beam can be adjusted by controlling the exposure time. In general, since the scanning time period by one bit data included in the above bit pattern is less than one pixel, the processing unit of PWM conversion need not to be limited to one pixel by setting the number of pieces of bit data.

FIG. 8A is a graph showing how many pieces of bit data are ON data out of 128 pieces of bit data in one pixel, regarding the halftone data of 100%, as a result of performing the exposure amount correction processing on the pixels at respective positions in the scanning direction of the laser beam. That is, the 128 pieces of bit data of the pixel at the left end of the scanning direction of the laser beam, whose exposure amount correction data is set to "1" are composed of 128 pieces of ON data. On the other hand, the 128 pieces of bit data of the pixel in the center in the scanning direction of the laser beam, whose exposure amount correction data is set to "0.77" is composed of 98 pieces of ON data and 30 pieces of OFF data. Here, the pulse width of the drive signal generated by sequentially outputting one bit at a time out of 128 pieces of bit data in synchronization with the clock signal is 128/128 at the left end pixel and 98/128 at the center pixel.

FIG. 8B shows the correction results of the exposure amount of four gradations (0%, 33%, 67% and 100%) with respect to the exposure amount after the correction processing control of the exposure amount. According to FIG. 8B, it can be seen that respective pixels in the scanning direction of the laser beam are formed with a substantially uniform exposure amount by correcting the exposure amount.

In this manner, the drive signal generating section 504 corrects the image data so that the exposure amount in the scanning direction of the laser beam becomes constant, and outputs one bit of the corrected image data at a time to the laser driving unit 310 in synchronization with the clock signal. That is, the drive signal generating section 504 outputs the PWM signal, which is a pulse signal based on the corrected image data, to the laser driving unit 310. The laser driving unit 310 performs ON/OFF driving of the laser beam source in accordance with the PWM signal output from the drive signal generating section 504.

As described above, the image forming apparatus of the present embodiment is configured to correct the image data by using the exposure amount correction data set corresponding to the respective positions in the scanning direction of the laser beam so as to output a PWM signal having a pulse width corresponding to each position in the scanning direction of the laser beam to the laser driving unit 310. With this configuration, the occurrence of a difference in the exposure amount for forming each pixel in the scanning direction of the laser beam can be suppressed.

Second Embodiment

In the first embodiment, the case where the number of pieces of bit data allocated to one pixel is sufficient in the processing in which the drive signal generating section 504 converts the halftone data into the bit pattern has been exemplified. However, in the case of an image forming apparatus in which the number of pieces of bit data allocated to one pixel is reduced and the capacity of the memory provided in the image forming apparatus is suppressed, the scaling of the exposure amount correction is not continuous but becomes more discrete. On the other hand, in the second embodiment, description will be made regarding the processing executed by the CPU 101 in the apparatus in which the number of divisions of one pixel is reduced in the processing in which the drive signal generating section 504 converts the halftone data into the bit pattern.

Figure 9A:
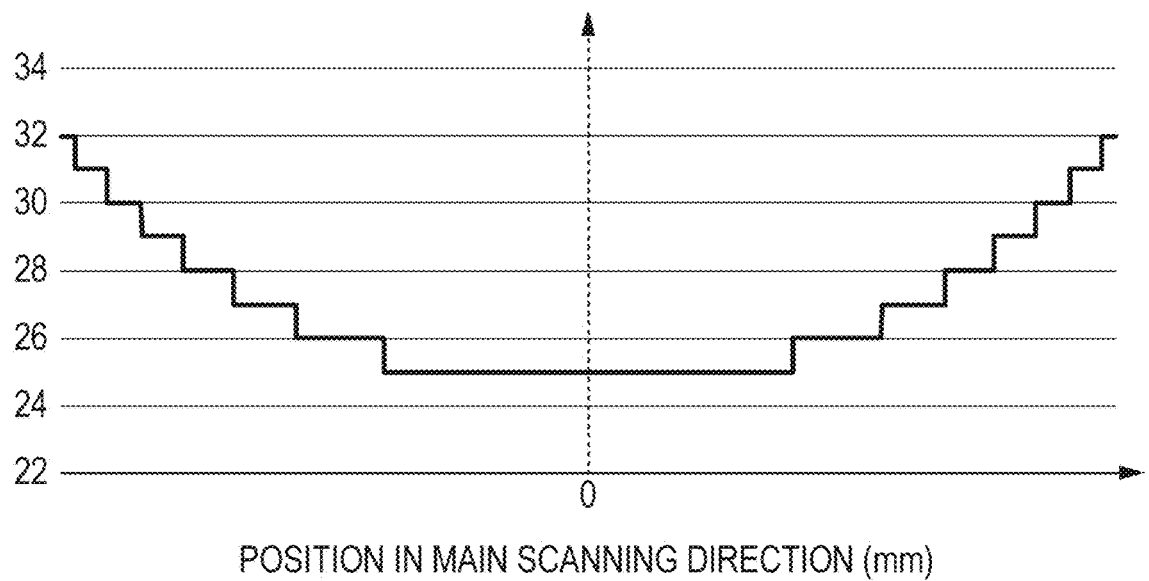
FIGS. 9A and 9B are diagrams showing exposure amount correction.
Figure 9B:
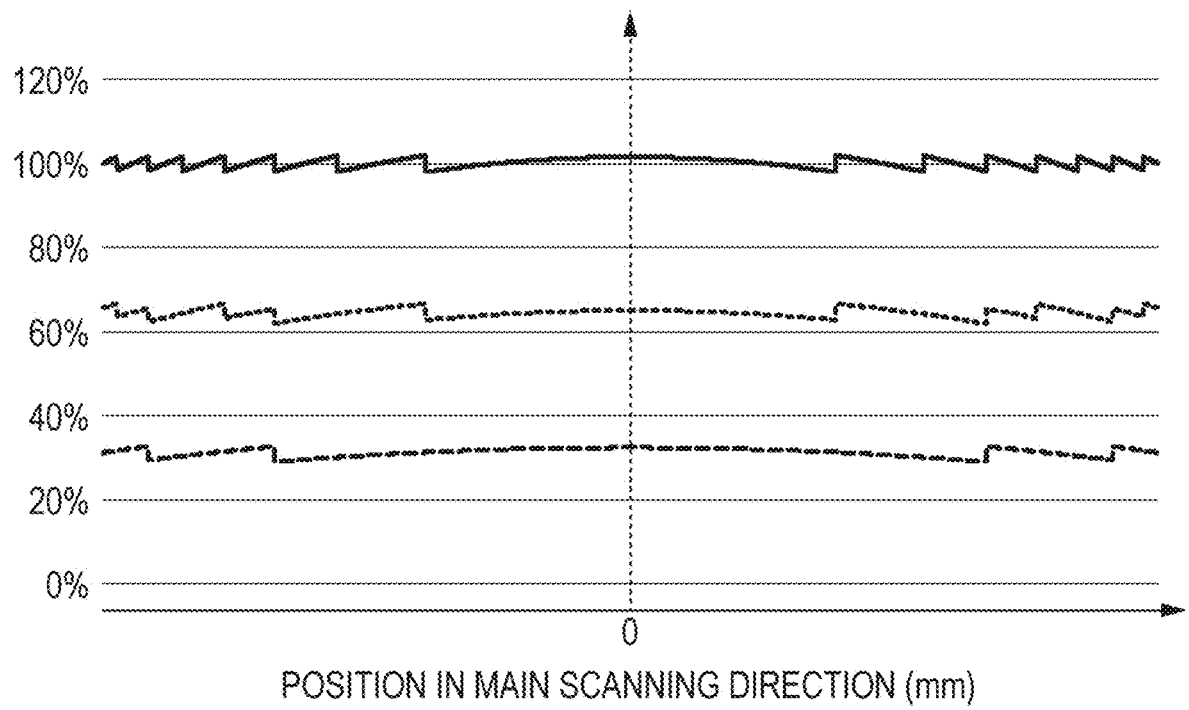

FIGS. 9A and 9B show the correction of the signal level of the PWM conversion processing when one pixel has 32 divisions and the corrected exposure amount. Also in the present embodiment, the exposure amount correction data shown in FIGS. 6A and 6B is used similarly to the first embodiment.

FIG. 9A is a graph showing how many divisions are lit among the 32 divisions of one pixel with respect to the signal level of 100% as a result of the correction of the exposure control. That is, at the left end where the light amount correction value is 1, 32 divisions are lit out of 32 divisions. On the other hand, at the center where the light amount correction value is 0.77, 25 divisions are lit out of 32 divisions. The pulse widths are 32/32 and 25/32, respectively.

FIG. 9B shows the correction results of the exposure amount of four gradations (0%, 33%, 67% and 100%) with respect to the exposure amount after exposure control. As can be understood from comparison with FIGS. 8A and 8B, in the case of an image forming apparatus that executes processing of image data in which the number of divisions in one pixel is reduced, the correction of the light amount becomes discrete and a step is generated in the exposure amount. As a result, a density step occurs between positions in the scanning direction of the laser beam.

In the second embodiment, the method of suppressing the density step which occurs as a result of the discontinuous scaling of the signal level will be described below.

The cause of the occurrence and the suppression method of the density step will be described in detail with reference to FIGS. 10A and 10B. The chart 1001 shows the control timing of signal level scaling for each pixel. Here, shown is an example in which the pulse width is scaled to n/32 up to a pixel at a certain position in the scanning direction of the laser beam by the exposure amount correction value and scaling of (n+1)/32 is performed from a pixel at a certain position.

The chart 1002 shows the transition of control for scaling for each pixel shown in the chart 1001.

Here, it has been found that the density step occurs at a place where the scaling of the pulse width shown in the chart 1001 changes. In the disclosure, the occurrence of the density step generated in this manner is suppressed by gradually changing over the pulse width.

The scaling control of the signal level for each pixel when the density step is suppressed is shown in the chart 1003. In addition, the chart 1004 shows the transition of control for scaling for each pixel indicated in the chart 1003. As shown in FIG. 10B, when changing over the pulse width from n/32 to (n+1)/32, changeover is performed not once but gradually. In this way, by dispersing the pulse width changeover positions, the density step which occurs when the signal level scaling is not continuous can be suppressed.

Figures 11A, 11B:
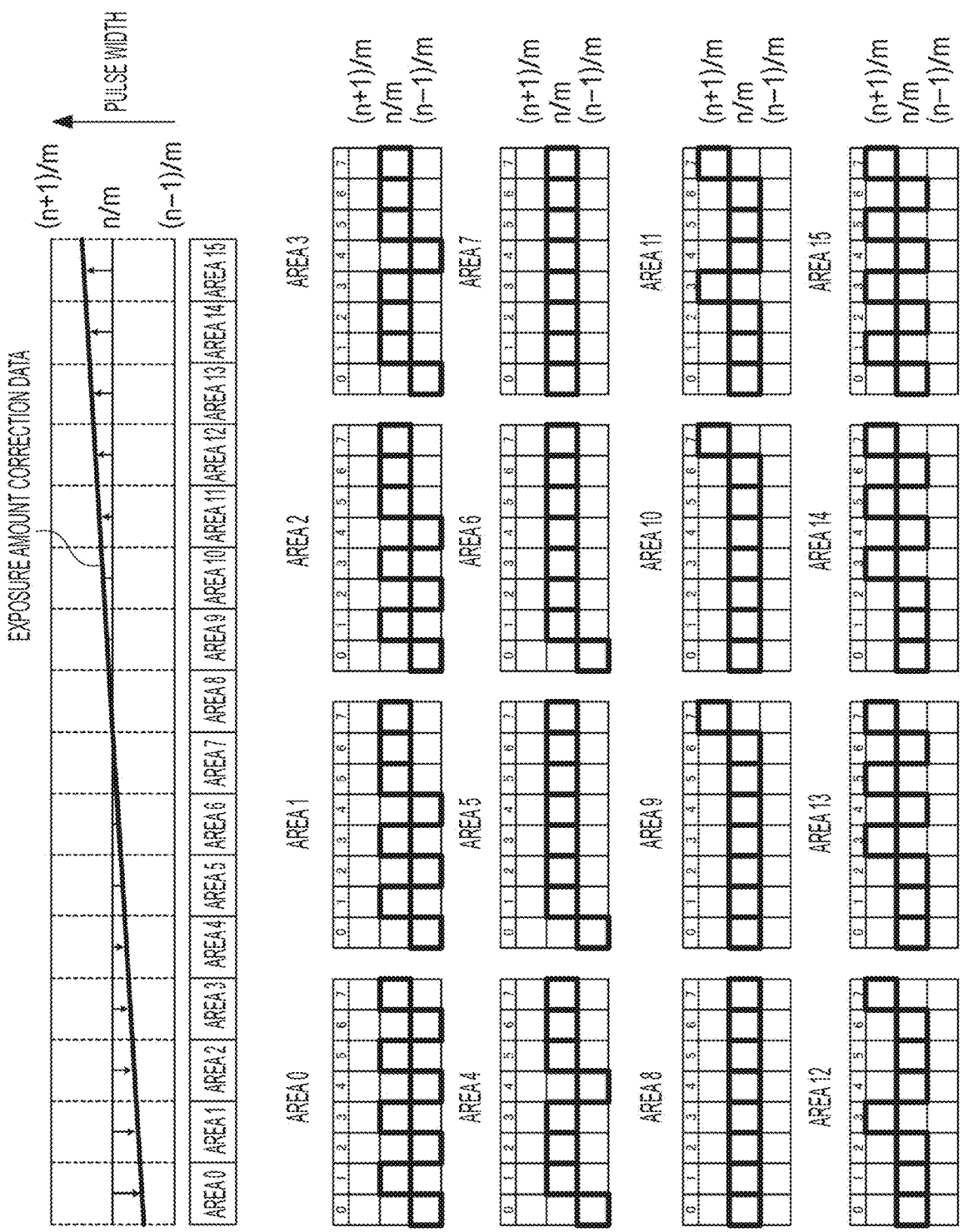
FIGS. 11A and 11B are diagrams showing an example of dispersing changeover positions of exposure amount correction.

FIGS. 11A and 11B show an embodiment in which the pulse width changeover positions are dispersed. FIG. 11A shows the relationship between the pulse width of the PWM signal and the exposure amount correction data. In this figure, the pulse width indicates the number of lighting points (number of pieces of ON data) n−1, n, and n+1, when one pixel is divided by the number of divisions m (number of pieces of bit data). That is, the scaling ratios of the signal levels are (n−1)/m, n/m, and (n+1)/m, respectively, and the scaling with this ratio is used even when the density value has multiple gradations. In this case, m≥n+1 is satisfied. Here, attention is paid to the difference between the exposure amount correction value for the signal level of 100% and the actual exposure amount correction data when the signal level is scaled with the pulse width in which n divisions out of the m divisions are lit in one pixel. The difference is represented by a value from negative to positive, but in accordance with this value, the main scanning position is divided into areas 0 to 15 as shown in the figure.

FIG. 11B shows a control example of pulse width changeover in each of the areas 0 to 15. Here, in each area, the pulse width of the portion surrounded by the black thick frame can be selected. The numerical values in the figure show the correspondence with the cycle counter. In the present embodiment, a cycle counter of a cycle of 8 pixels (0 to 7) in units of pixels in the main scanning direction is provided for printing of a pixel. By using this counter value, the pulse width of the numerical value corresponding to the counter value is selected in each area.

That is, in the area 0 where the difference between the exposure amount correction value in the case where the pulse width is scaled as n and the exposure amount correction data is the largest on the negative side, the pulse widths n−1 and n are alternately changed over. On the contrary, in the area 15 where the difference between the exposure amount correction value and the exposure amount correction data is the largest on the positive side, the pulse widths n and n+1 are alternately changed over. On the other hand, the pulse width is not changed over and the pulse widths in the area are all set to n in the areas 7 and 8 where there is almost no difference between the exposure amount correction value when the pulse width is scaled as n and the exposure amount correction data.

Figure 12:
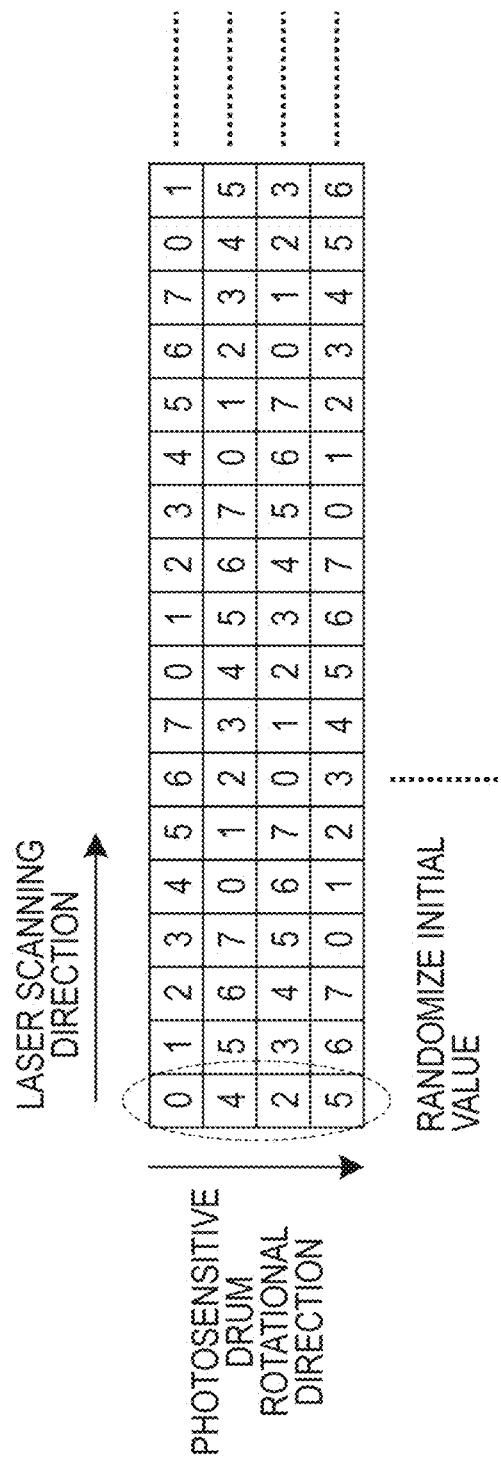
FIG. 12 is a changeover table for dispersing changeover positions.

If the cycle counter at a certain position of main scanning is constant regardless of the position of the sub-scanning, pulse width changeover occurs at the same main scanning position, which may affect the image quality. Therefore, the initial value of the cycle counter for each scanning line may randomly be changed. FIG. 12 shows a table for randomly changing over the initial value of the cycle counter for each scanning line. The horizontal axis corresponds to the scanning direction of the laser beam, and the vertical axis corresponds to the rotational direction of the photosensitive drum. The cycle counter is a cycle counter having a cycle of 8 pixels (0 to 7) in units of pixels in the main scanning direction. Here, as shown in the figure, by changing the initial value using a random number for each scanning line, the occurrence of pulse width changeover of the pixel at the same position in the laser scanning direction can be prevented.

As described above, in the second embodiment, the image data is corrected in accordance with the main scanning position by the exposure amount correction data, and the PWM conversion processing is performed. At this time, the density step which can be generated by reducing the number of divisions of the pixel in the PWM conversion processing can be suppressed by dispersing the changeover positions in correction in the main scanning direction. Due to this, the exposure amount on the surface of the photoreceptor is made uniform, and printing with suppressed density unevenness becomes possible.

Third Embodiment

In the first and second embodiments, it is assumed that the scanning lens of the optical scanning device has the fθ characteristic. An example is shown in which the intensity of the laser beam differs depending on the position in the main scanning direction due to the transmission loss of the scanning lens, and as a result, the exposure amount becomes nonuniform.

On the other hand, in recent years, in order to reduce the size and cost of the image forming apparatus, it is studied not to use a scanning lens or to use a small scanning lens not having the fθ characteristic.

In such an optical scanning unit in which the spot of the laser beam does not move on the surface of the photoreceptor at a constant speed, the partial magnification correction is performed according to the position in the main scanning position. To be specific, the frequency of the image clock is changed in accordance with the main scanning position, and the light emitting time period of the laser beam per pixel is shortened at the ends of the photoreceptor as compared with the center. Due to this, correction is made so that the pixel size of one pixel at the ends of the photoreceptor is equal to that at the center.

However, although the size of one pixel formed on the surface of the photoreceptor is constant in this case, the exposure amount per pixel is different because the emission time period of the laser beam on the surface of the photoreceptor is different.

Also for the correction of the exposure amount in the case of not using the scanning lens or using a small scanning lens which does not have the fθ characteristic in this way, the correction shown in the first embodiment and the second embodiment can be employed. That is, exposure amount correction data is created from the exposure amount characteristic of the optical scanning device. By the correction of the image data shown in the first and second embodiments using the exposure amount correction data, even in the case where the exposure amount is not constant, printing suppressing occurrence of density unevenness can be performed.

Fourth Embodiment

Figure 13:
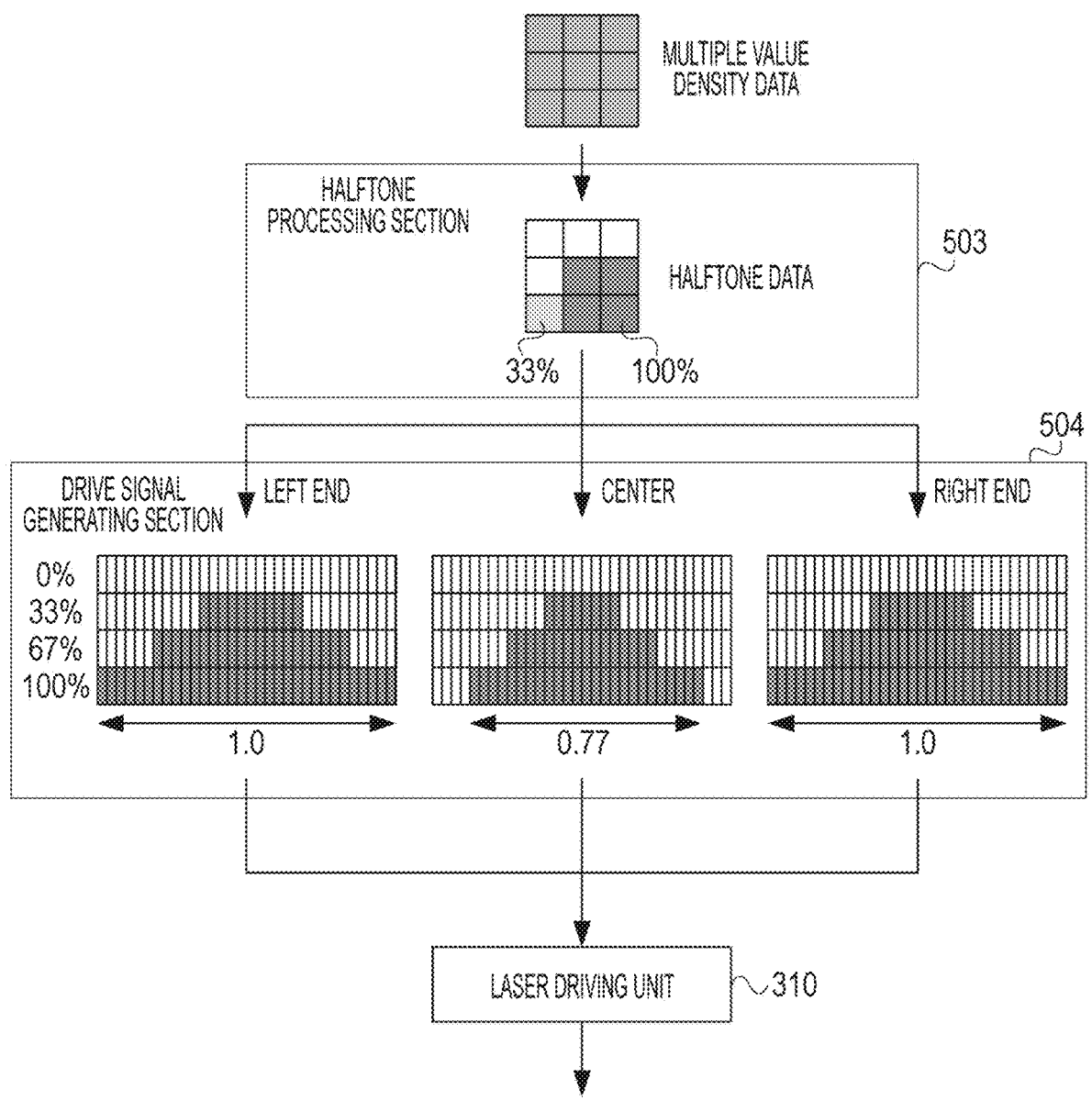
FIG. 13 is a schematic diagram showing bit pattern generation processing in a fourth embodiment.

In the first to third embodiments, in the system of the optical scanning device in which the exposure amount is not constant, the occurrence of density unevenness is suppressed by correcting the image data based on the exposure amount correction data. On the other hand, in the fourth embodiment, the exposure amount is corrected by changing over the table used in the PWM conversion unit according to the main scanning position instead of correcting the image data. FIG. 13 shows a conceptual diagram of the fourth embodiment.

The halftone processing in the halftone processing section 503 is similar to that described with reference to FIG. 7. On the other hand, the correction of the image data by the exposure control processing described with reference to FIG. 7 is not performed in the fourth embodiment. Instead, processing equivalent to the exposure control processing is performed by changing over the table to be used at the time of the PWM conversion processing in the drive signal generating section 504 for the scaling of the signal level performed by the correction of the image data.

To be specific, at the left end and the right end, which are the photoreceptor ends, the exposure amount correction value is 1, and no correction is made. That is, PWM signals that light 0, 11, 21, and 32 divisions out of 32 divisions corresponding to 0%, 33%, 67%, and 100% are output in the PWM conversion for 32 divisions in one pixel.

On the other hand, in the center on the surface of the photoreceptor, the exposure amount correction value is 0.77, and in this case, 0%, 33%, 67%, 100% signal levels are converted into the PWM signals which light 0, 8, 16 and 25 divisions in the PWM conversion for 32 divisions in one pixel.

By transmitting the PWM signal thus generated to the laser driving unit 310, the laser driving unit 310 controls to cause the laser beam source to be turned on or off based on the PWM signals.

As described above, in the fourth embodiment, the changeover processing of the table to be used for the PWM conversion processing is performed according to the position of the main scanning by the exposure amount correction data. Due to this, the exposure amount on the surface of the photoreceptor is made uniform, and printing with suppressed density unevenness becomes possible.

According to the image forming apparatus of the aspect of the embodiments, the exposure amount per unit area on the photoreceptor can be corrected to be substantially uniform by correcting the image data based on the correction data corresponding to the position in the scanning direction of the laser beam.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-167252, filed Aug. 31, 2017, which is hereby incorporated by reference herein in its entirety.

What is claimed is:

1. An apparatus comprising:
a photoreceptor;
a laser beam source configured to emit a laser beam to which the photoreceptor is exposed;
a driving unit configured to perform ON/OFF driving of the laser beam source in accordance with a drive signal including a pulse for causing the laser beam source to emit the laser beam;
a mirror configured to deflect the laser beam so that the photoreceptor is scanned with the laser beam;
a processing unit configured to perform halftone processing for generating density data for each pixel based on input image data;
a storage unit configured to store a plurality of conversion tables for correcting an exposure amount of the photoreceptor per unit area and a plurality of pieces of exposure amount correcting data, each piece of data being set for each of a plurality of areas of the photoreceptor divided in a scanning direction of the laser beam, wherein the plurality of conversion tables corresponding to each pixel in the scanning direction of the laser beam for converting a bit pattern including a plurality of pieces of bit data based on generated density data into ON/OFF data, and the plurality of conversion tables includes a plurality of tables each table having a different number of bit patterns assigned to one pixel; and
a generating unit configured to generate the drive signal for each pixel included in the plurality of areas based on based on the generated density data, the conversion tables, and the plurality of pieces of exposure amount correcting data, wherein the generating unit generates the driving signal for each of the pixels included in at least a part of the plurality of areas by using a plurality of conversion tables in a mixed manner.

2. The apparatus according to claim 1, further comprising:
a receiving unit configured to receive the laser beam, wherein
the driving unit controls a value of a driving current to be supplied to the laser beam source so that the laser beam incident on the receiving unit reaches a target light amount and supplies the driving current of the value to the laser beam source.

* * * * *